B. R. KOERING.
PRECIPITATION DEVICE.
APPLICATION FILED JULY 27, 1914. RENEWED AUG. 2, 1915.
1,163,829.
Patented Dec. 14, 1915.
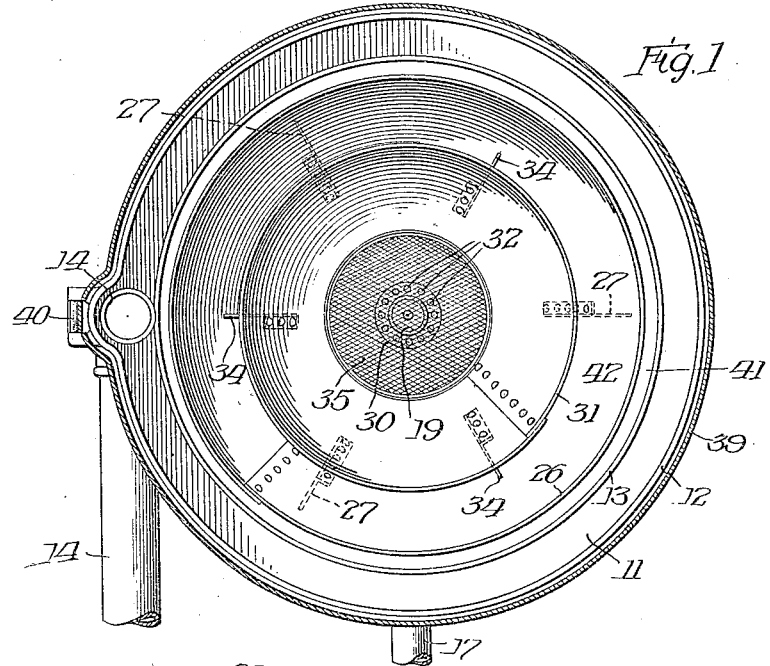
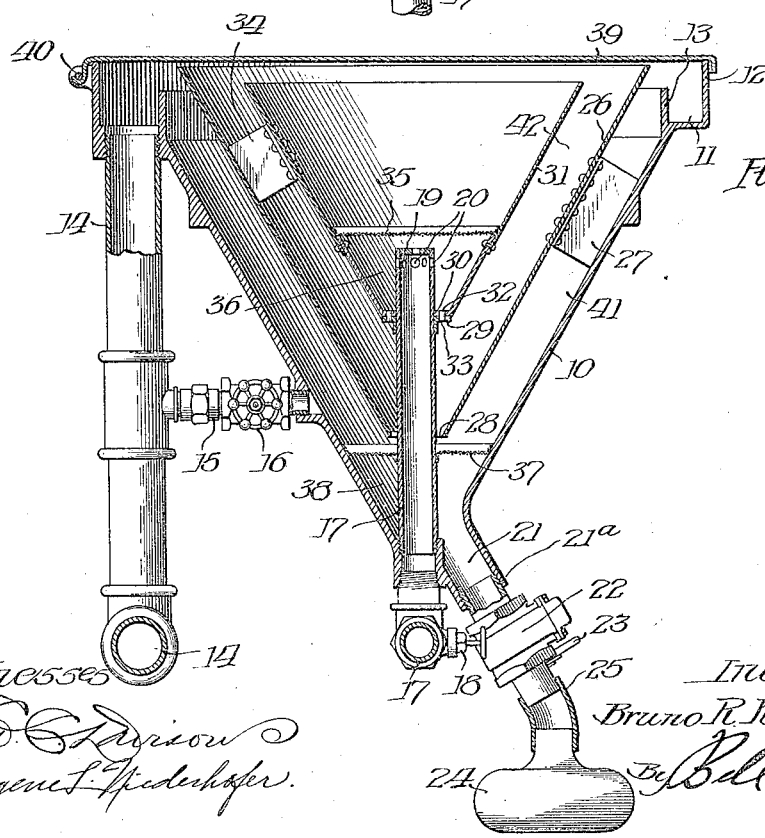
Witnesses
Inventor:
Bruno R. Koering

UNITED STATES PATENT OFFICE.

BRUNO R. KOERING, OF DETROIT, MICHIGAN, ASSIGNOR TO KOERING CYANIDING PROCESS COMPANY, OF DETROIT, MICHIGAN, A CORPORATION OF ARIZONA.

PRECIPITATION DEVICE.

1,163,829. Specification of Letters Patent. Patented Dec. 14, 1915.

Application filed July 27, 1914, Serial No. 853,351. Renewed August 2, 1915. Serial No. 43,346.

*To all whom it may concern:*

Be it known that I, BRUNO R. KOERING, a citizen of the United States, residing at Detroit, in the county of Wayne and State of Michigan, have invented certain new and useful Improvements in Precipitation Devices, of which the following is a specification.

My invention relates to precipitation devices, and refers particularly (although not exclusively) to such devices as used for the precipitation from a solution of precious metals, such as gold and silver.

In the process of recovering gold and silver from their ores it is customary to leach the ores with a metal-extracting solution, such as potassium cyanid, or the like. This solution is filtered, and the precious metals contained therein are then recovered from the solution by precipitation in the presence of a suitable metal or otherwise. In the case of gold the solution is subjected to the action of a metal, such as zinc, which causes the gold to separate from the solution in a metallic state.

It is the object of my invention to provide a highly efficient precipitation device which will bring the metal-bearing solution into closer and better contact with the precipitant, such as zinc, than has heretofore been possible.

It is a further object of my invention to provide a device which occupies but small space, while at the same time it is capable of handling large quantities of solution in a comparatively short time, and will require less precipitant in each unit than has heretofore been used in precipitation devices.

Still further objects of my invention are to afford a ready and complete control of the flow of solution through the device so that sufficient time may be allowed for the thorough and complete precipitation of the metal; to readily collect the precipitate separate from the precipitant; and to remove the precipitate and to charge new precipitant at any time without interrupting the precipitation process.

I accomplish the various results outlined above by the use of a device consisting of a plurality of basins, preferably arranged concentrically with each other, these basins preferably being cone-shaped, and of metal or other suitable material, such as wood or glass. The basins are arranged so that the metal-bearing solution passes through them successively, and during this operation passes through a large exposed area of the precipitant which is contained in the basins; or, if a gaseous or liquid precipitant is used, this may be injected into the apparatus with the solution. The device is provided with precipitate collecting pockets, which are separate from the compartments containing the precipitant (when a solid precipitant is used). The precipitate collecting by reason of the action of the precipitant may be readily removed at any time during the process in a manner which will be described in detail hereafter. After the metal-bearing solution has passed through the precipitation device and the metals have been extracted from said solution, the latter is collected and may be used over again for the further leaching of ores. These and other advantages of my invention will be more readily understood by reference to the accompanying drawings, which show a preferred embodiment of my invention, and in which:

Figure 1 is a plan of my precipitation device, the cover being shown in horizontal section; and Fig. 2 is a vertical longitudinal section through the device shown in Fig. 1.

In the form of my precipitation device illustrated in the drawings the outer basin 10 is cone-shaped and serves as the support for the inner basins, which will presently be described. At its upper rim the basin 10 is provided with the trough 11 having the outer wall 12 and the inner wall 13, which, as clearly shown in Fig. 2, is somewhat lower than the outer wall 12. The outlet pipe 14 leads from the trough 11, and an auxiliary pipe 15 leads from the outlet pipe 14 to the lower portion of the basin 10 for the purpose of draining this basin when desired. The pipe 15 is provided with the valve 16 which is normally kept closed. The inlet pipe 17 provided with the valve 18 passes upwardly through the basin 10. At its upper end the inlet pipe 17 has the apertured end member 19 and a plurality of lateral apertures 20 for the purpose of uniformly introducing the solution flowing through the inlet pipe 17 into the precipitation device. The basin 10 is also provided with the precipitate discharge passage 21 which communicates with the pipe 21ᵃ having therein the gate valve 22 controlled by the handle 23. A bottle or flask 24 may be readily attached to the lower end of the pipe 21ª by means of a connection 25, of rubber or the like, for the purpose which will presently be described.

Within the outer basin 10 is located the intermediate basin 26, also cone-shaped and concentric with the outer basin 10. The basin 26 is provided with lugs 27 on its outer surface, these lugs serving to support the basin 26 within the basin 10. The upper rim of the basin 26 is higher than the upper rim of the inner wall 13 of the trough 11. At the apex of the basin 26 is provided the aperture 28, which is somewhat larger in diameter than the outside of the inlet pipe 17 so that an annular space is provided between the outside of this pipe and the lower edge of the basin 26. Toward the upper end of the inlet pipe 17 is located the apertured collar 29, and this collar is engaged by the apertured lower end 30 of the inner cone-shaped basin 31, the apertures 32 of the end member 30 being adapted to be brought in register with the apertures 33 in the collar 29, this result being accomplished by slightly rotating the inner basin 31. It will thus be seen that the collar 29 in reality constitutes a valve at the lower end of the basin 31, this valve being adapted to be opened or closed by rotation of the inner basin. The inner basin 31 is provided with lugs 34 similar to the lugs 27 of the intermediate basin 23. These lugs resting against the inner surface of the intermediate basin 26 serve to hold the inner basin 31 in position. It will be evident that by the use of the supporting means just described the inner and intermediate basins may be readily removed for cleaning or any other purpose when desired. The inner basin 31 is provided toward its lower end with the precipitant retaining screen 35, which occupies a position just above the upper end of the inlet pipe 17. A precipitate pocket 36 is thereby formed in the inner basin 31 in that portion of the latter located below the precipitant screen 35. The upper rim of the inner basin 31 is at a lower level than the upper rim of the intermediate basin 26 but at a slightly higher level than the upper rim of the inner wall 13 of the trough 11.

In the lower portion of the outer basin 10 is provided a precipitant retaining screen 37, this screen being located just below the lower end of the intermediate basin 26 and forming a precipitate pocket 38 in the outer basin 10 in the portion of the latter located below the precipitant screen 37. The top of the device is provided with a cover 39 which is suitably hinged at 40.

Having thus described the various parts which are used in my invention, the operation of the same may now be readily understood: Before the metal-bearing solution is admitted to the apparatus the precipitant, such as zinc, is charged into the inner basin 31 so that this precipitant is caused to rest on the screen 35 and fills a considerable portion of the inner basin. Additional precipitant is also preferably charged into the compartment 41 located between the outer basin 10 and the intermediate basin 26, and is supported by the screen 37. If desired, still further precipitant may be added in the compartment 42 located between the intermediate basin 26 and the inner basin 31. Solution is admitted to the apparatus by opening the valve 18 in the inlet pipe 17. The solution passes through the apertures located at the end of the inlet pipe into the precipitate pocket 36, the inner basin 31 being meanwhile placed in such position that the apertures 32 and 33 do not register with each other. The solution then passes upwardly through the screen 35 and through the precipitant which is within the inner basin 31, thereby subjecting the solution to a large exposed superficial surface of the precipitant. The solution then overflows the upper rim of the inner basin 31 and passes downwardly through the compartment 42 into the outer basin 10, first filling the precipitate pocket 38 and the discharge outlet 21, the gate valve 22 meanwhile being closed. The solution next passes upwardly through the screen 37 and the precipitant within the compartment 41 until it reaches the rim of the inner wall 13 of the trough 11. The solution then flows over the rim of the wall 13 into the trough 11 and then passes through the outlet pipe 14 after which it may be collected, its full strength restored, and it may be used for further leaching the ores. The rapidity of the passage of solution through the apparatus may be controlled by the valve 18 in the pipe 17. The rate of flow of the solution should be such that with the amount of precipitant used all metal may be precipitated from the solution. By increasing the amount of precipitant, as, for example, completely filling the compartment 41, and also by using precipitant in the compartment 42, the rate of flow of the solution may be very rapid, thereby making it possible to handle a large amount of solution in a given unit of time. On account of the fact that the precipitate (such as metallic gold) is heavier than the solution and also that the velocity of flow of the solution decreases in its upward movement by reason of the increase of sectional area of the basins toward their top, the precipitate gradually settles into the precipitate pockets 36 and 38. In order to remove the precipitate collecting in the pocket 36 the inner basin 31 is slightly rotated so that the apertures 32 and 33 are brought into register with each other. The precipitate then drops through these apertures and passes downwardly through the screen 37 and collects in the lower precipitate pocket 38. In order to remove the precipitate from the pocket 38 the flask or bottle 24 is filled with water and attached to the lower end of the pipe 21ª by the connection 25. The valve 22 is then opened and the precipitate within the pockets 38 falls by gravity into the flask 24, displacing an equivalent amount of water which rises from the flask into the precipitate pocket. When the flask 24 is filled with the precipitate the valve 22 is closed, the bottle containing the precipitate is removed, and another bottle is substituted, and the precipitate pocket is again drained of its precipitate.

It will be evident that by means of the apparatus which I have described the precipitate may be withdrawn at any time without interrupting the process, while at the same time additional precipitant may be added as required simply by lifting the cover 39 and charging the precipitant in the desired portion of the apparatus. When it is desired to stop the further operation of the device, the inlet valve 18 is first closed and the major portion of the solution is withdrawn by opening the valve 16 so that the solution passes through the pipe 15 into the outlet pipe 14. The final clean-up is then made by opening the valve 22 and washing out through the discharge opening 21 and the pipe 21ª all precipitate which is contained within the device and which may have adhered to the walls of the latter.

It will be apparent to those skilled in the art that many changes could be made in the detailed construction of the various parts which I have shown without departing from the spirit or scope of my invention. For example, although I have described three precipitation basins as being used in concentric relation to each other, it will be clear that any number of such basins might be used; and, although I prefer to have these basins cone-shaped, other shapes can be used with satisfactory results.

What I claim is:

1. A precipitation device, comprising a plurality of concentrically arranged compartments each of which is adapted to contain a precipitant, means for causing a solution to flow successively through said compartments, and means for removing precipitate collecting in said compartments during the flow of said solution therethrough.

2. In a precipitation device, the combination of a plurality of concentrically arranged compartments each of which is adapted to contain a precipitant and each of which increases in sectional area toward its top, and means for causing a solution to flow successively through said compartments.

3. A precipitation device, comprising a plurality of basins concentrically arranged, said basins communicating with each other successively at their upper and lower portions, and means for introducing a solution into one of said basins, whereby said solution is caused to flow successively through said basins.

4. A precipitation device, comprising a plurality of conical basins concentrically arranged, said basins communicating with each other successively at their upper and lower portions, means for introducing a solution into one of said basins, whereby said solution is caused to flow successively through said basins, and means for removing precipitate collecting in said basins during the flow of said solution therethrough.

5. A precipitation device, comprising the combination of a plurality of conical basins concentrically arranged, means for removably supporting the inner basins within the outer basin in spaced relation to each other, whereby a plurality of compartments is formed, said compartments communicating with each other at their upper and lower portions in succession, means for introducing a solution into one of said basins, whereby said solution is caused to flow successively through said basins, and a valved discharge opening in the lower portion of the outer basin, whereby precipitate collecting in said basin may be removed without interrupting the flow of solution through said device.

6. A precipitation device, comprising the combination of a plurality of conical basins concentrically arranged and communicating with each other at their upper and lower portions in succession, an inlet pipe extending into the inner basin, means for controlling the flow of solution through said pipe, and a valved discharge opening from the outer basin, whereby precipitate collecting in the latter may be removed without interrupting the flow of solution through said device.

7. In a precipitation device, the combination of a plurality of conical basins concentrically arranged and communicating with each other at their upper and lower portions in succession, precipitant supporting means in at least one of said basins, means for introducing solution into the basin containing said supporting means at a point below the latter, and means for removing precipitate collecting in said basin during the flow of solution therethrough.

8. A precipitation device, comprising the combination of a plurality of conical basins concentrically arranged and communicating with each other at their upper and lower portions in succession, precipitant supporting means in the inner basin, means for introducing solution into said inner basin below said supporting means, means for carrying away solution from the upper portion of the outer basin, and means for removing from said outer basin the precipitate collecting therein without interrupting the flow of solution through said device.

9. A precipitation device, comprising the combination of a plurality of conical-shaped basins concentrically arranged and communicating with each other at their upper and lower portions in succession, means for introducing a solution into said inner basin, valve means located at the lower portion of said inner basin, whereby precipitate collecting in said inner basin may be discharged into an outer basin, and means for removing precipitate from said outer basin without interrupting the flow of solution through said device.

10. In a precipitation device, the combination of a plurality of conical basins concentrically arranged and communicating with each other at their upper and lower portions in succession, precipitant supporting means in the inner and the outer basins, means for introducing solution into said inner basin at a point below the supporting means therein, means for discharging precipitate collecting in said inner basin into said outer basin, and means for removing precipitate in said outer basin without interrupting the flow of solution through said device.

11. In a precipitation device, the combination of three conical basins concentrically arranged, the intermediate and outer basins communicating with each other at the lower portion of the former, the intermediate basin having its upper rim at a higher level than the rim of said inner basin, outlet means from said outer basin at a lower level than the rim of said intermediate basin, means for introducing solution into said inner basin, whereby said solution will flow upwardly through said inner basin, downwardly through said intermediate basin and upwardly through said outer basin, and means for withdrawing from said outer basin precipitate collecting therein without interrupting the flow of said solution therethrough.

12. In a precipitation device, the combination of three conical basins concentrically arranged, the intermediate and outer basins communicating with each other at the lower portion of the former, the intermediate basin having its upper rim at a higher level than the rim of said inner basin, outlet means from said outer basin at a lower level than the rim of said intermediate basin, precipitant supporting means in said inner basin and above the bottom thereof, whereby a precipitate pocket is formed in said inner basin below said supporting means, precipitant supporting means in said outer basin above the bottom of said basin but below the lower end of said intermediate basin, whereby a precipitate pocket is formed in said outer basin below said supporting means therein, a solution inlet pipe extending into said inner basin and terminationg below the supporting means therein, whereby solution introduced into said inner basin will flow upwardly through said inner basin, downwardly through said intermediate basin and upwardly through said outer basin, valve means at the lower portion of the precipitate pocket of said inner basin, whereby precipitate collecting in said inner basin may be discharged into said outer basin, and a valved outlet from the apex of said outer basin, whereby precipitate may be removed therefrom without interrupting the flow of solution through said precipitation device.

In witness whereof, I hereunto subscribe my name this 24 day of July, A. D., 1914.

BRUNO R. KOERING.

Witnesses:
CHAS. P. BENOIT, Jr.,
H. M. LIVINGSTON.

Copies of this patent may be obtained for five cents each, by addressing the "Commissioner of Patents, Washington, D. C."